United States Patent [19]

Mishima et al.

[11] Patent Number: 5,116,909
[45] Date of Patent: May 26, 1992

[54] FLAME-RETARDANT INJECTION-MOLDING RESIN COMPOSITION

[75] Inventors: Ikuhiro Mishima; Kenji Nishimoto; Hideki Hosoi, all of Hyogo, Japan

[73] Assignee: Kanegafuchi Kagaku Kogyo Kabushiki Kaisha, Osaka, Japan

[21] Appl. No.: 490,888

[22] Filed: Mar. 9, 1990

[30] Foreign Application Priority Data

Mar. 10, 1989 [JP] Japan .................. 1-58222

[51] Int. Cl.⁵ ................ C08L 33/06; C08L 33/18
[52] U.S. Cl. .................... 525/227; 525/203; 525/207; 525/228; 525/230
[58] Field of Search ............ 525/203, 207, 227, 228, 525/230

[56] References Cited

U.S. PATENT DOCUMENTS

| | | | |
|---|---|---|---|
| 3,536,788 | 10/1970 | Hurwitz | 260/890 |
| 4,111,876 | 9/1978 | Bailey | 260/29.6 RB |
| 4,391,948 | 7/1983 | Falk | 525/57 |
| 4,460,742 | 7/1984 | Kishida | 525/64 |
| 4,518,515 | 5/1985 | Ott | 525/79 |
| 4,518,743 | 5/1985 | Lindner | 525/80 |
| 4,764,563 | 8/1988 | Meredith | 525/316 |

Primary Examiner—Jacob Ziegler
Attorney, Agent, or Firm—Armstrong, Nikaido, Marmelstein, Kubovcik & Murray

[57] ABSTRACT

A flame-retardant injection-molding resin composition. The composition contains (A) 100 parts by weight of a flame-retardant resin composed of 30% to 80% by weight of styrene resin having a reduced viscosity of methyl-ethyl-ketone soluble portions of 0.2 to 0.55 dl/g in N,N-dimethylformamide at a concentration of 0.3 g/dl at 30° C., and from 20% to 70% by weight of a polyvinyl chloride resin having a polymerization degree of from 400 to 800; and (B) 0.5 to 10 parts by weight of a copolymer of from 3% to 35% by weight of a vinyl cyanide compound, 30% to 97% by weight of an alkyl acrylate and 0% to 67% by weight of a vinyl monomer being copolymerizable with the vinyl cyanide compound and the alkyl acrylate. The flame-retardant injection-molding resin composition provides injection-molded articles of high impact strength and low delamination tendency and has excellent thermal stability, flame resistance and heat stability.

3 Claims, No Drawings

FLAME-RETARDANT INJECTION-MOLDING RESIN COMPOSITION

FIELD OF THE INVENTION

The present invention relates to a flame retardant injection-molding resin composition, which gives injection-molded articles having remarkably high impact strength and remarkably high mold releasability, and yet has sufficient thermal stability during injection molding. More particularly, the present invention relates to a flame-retardant injection-molding resin composition comprising a low-molecular-weight styrene resin and a low-polymerization-degree vinyl chloride resin, and additionally as an essential component a copolymer composed of a vinyl cyanide compound and an alkyl acrylate.

BACKGROUND OF THE INVENTION

Flame-retardant injection-molding resins consisting of a low-molecular-weight styrene resin and a low-polymerization-degree vinyl chloride resin are superior materials in view of the mechanical properties and the economical efficiency thereof, and recently are being used as a housing material of OA apparatuses and the like. These flame-retardant resins, however, have disadvantages that burned spots and flashes are liable to be formed in articles molded therefrom and thus the procedure for molding the resins is not simple. This is considered to be caused by the fact that the vinyl chloride resin raises the melt-viscosity of the flame-retardant resin during injection molding, resulting in a larger heat generation in the molding process by shearing forces created by the metal of the screw, the cylinder, and the mold of an injection machine, thus giving rise to thermal decomposition of the resin to form the burned spots and flashes. The general measures which have been introduced to overcome these disadvantages are addition of a large amount of a stabilizer or a lubricant, and addition of processability-improving agent of the alkyl acrylate type.

However, the former method leads to a higher cost of the material, a lower impact strength, and a lower heat distortion temperature, and thus is not desirable from the standpoint of the quality of the molded articles. The latter method of adding an alkyl acrylate as a processability-improving agent involves disadvantages such that the impact strength of the injection molded articles is lowered, and delamination of the resin may occur at a gate portion in separating the gate portion resin from the injection molded article at the completion of the molding, although this method is very useful because of a lower cost of the material and a smaller lowering of the heat distortion temperature. In particular, use of an increased amount of the processability-improving agent for enhancing the improvement effect will adversely decrease the impact strength and remarkably increase the delamination of the injection-molded articles.

The aforementioned disadvantages are considered to be caused by the use of a processability-improving agent of the alkyl acrylate type which is intended to improve the processability of extrusion-molding resins having approximately 200,000 to 100,000 of a molecular weight notwithstanding those of injection-molding resins having approximately 100,000 to 50,000 of a molecular weight.

The inventors of the present invention noticed that (a) a remarkably high shear rate of 10,000/sec to 100,000/sec is applied to the resin during injection molding in comparison with that of 100/sec to 1,000/sec applied during extrusion molding and (b) the flame-retardant resin to which the processability-improving agent is to be added is not a resin having a usual molecular weight but a special flame-retardant injection-molding resin composed of a low-molecular-weight styrene resin and a low-polymerization-degree vinyl chloride resin. Based on this consideration, the inventors of the present invention made a comprehensive study to provide a fire-retardant injection-molding resin composition which contains an alkyl acrylate type of processability-improving agent without an accompanying decreased effect on thermal stability improvement, lowered impact strength, or delamination of injection-molded articles at the gate portion. Consequently, the inventors found surprisingly that incorporation of an alkyl acrylate copolymer of a specific composition into the resin composition can avoid a decrease in impact strength and delamination of the molded article at the gate portion, and yet can improve the thermal stabilizing effect as compared with a prior known resin composition, and completed the present invention.

SUMMARY OF THE INVENTION

The present invention provides a flame-retardant injection-molding resin composition which contains a processability-improving agent of the alkyl acrylate type but which does not have the impaired effect on thermal stability improvement, lowered impact strength, and delamination of injection-molded articles at the gate portion which are typically caused by a processability-improving agent.

The present invention provides a flame-retardant injection-molding resin composition comprising: (A) 100 parts by weight of a flame-retardant resin composed of from 30% to 80% by weight of a styrene resin having a reduced viscosity of a methyl-ethyl-ketone soluble portion of from 0.2 to 0.55 dl/g at a concentration of 0.3 g/dl in N,N-dimethylformamide at 30° C., and from 20% to 70% by weight of a polyvinyl chloride resin having a polymerization degree of from 400 to 800; and (B) 0.5 to 10 parts by weight, based on to 100 parts by weight of the flame-retardant resin, of a copolymer of from 3% to 35% by weight of a vinyl cyanide compound, 30% to 97% by weight of alkyl acrylate, and 0% to 67% by weight of a vinyl monomer being copolymerizable with the vinyl cyanide compound and the alkyl acrylate.

DETAILED DESCRIPTION OF THE INVENTION

In the present invention, as described above, a flame-retardant injection-molding resin composition is obtained from a flame-retardant resin (hereinafter referred to as Component (A)) composed of from 30 to 80% by weight of a styrene resin having a reduced viscosity of a methyl-ethyl-ketone soluble portion of 0.2 to 0.55 dl/g in N,N-dimethylformamide at a concentration of 0.3 g/dl at 30° C., and from 20 to 70% by weight of a polyvinyl chloride resin having a polymerization degree (which is used herein to mean an average polymerization degree) of 400 to 800; by adding thereto a specified modifying agent (hereinafter referred to as Component (B)), without loss of impact strength and without delamination at the gate portion of a molded article, but with high thermal stability.

In the flame-retardant injection-molding resin composition of the present invention, both the styrene resin and the vinyl chloride resin are essential components. In the absence of any one of these essential components, the effects of the Component (B) cannot be achieved simultaneously: namely the effect of improving thermal stability without decrease of the impact-strength and without delamination of the molded article at the gate portion.

The styrene resins employed as the Component (A) are those compatible with vinyl chloride resins, including acrylonitrile-butadiene-styrene (ABS) resins, acrylonitrile-styrene(AS) resins, methylmethacrylate-butadiene-styrene (MBS). resins, methylmethacrylate-acrylonitrile-butadiene-styrene (MABS) resins, copolymers of acrylonitrile-butadiene-styrene-α-methylstyrene. copolymers of acrylonitrile-methyl methacrylate-butadiene-styrene-α-methylstyrene, copolymers of acrylonitrile-butadiene-styrene-α-methylstyrenemaleimide. acrylonitrile-alkylacrylate-styrene (AAS) resins, acrylonitrile-ethylenepropylene-styrene (AES) resins, copolymers of styrene-maleic anhydride, copolymers of styrenemaleimide, and the like.

The reduced viscosity of the styrene resins at a methyl-ethyl-ketone soluble portion should preferably be not less than 0.2 dl/g and, more preferably, not less than 0.25 dl/g in N,N-dimethylformamide at a concentration of 0.3 g/dl at 30° C., since a resin having a reduced viscosity below 0.2 dl/g tends to have lower impact strength. On the other hand, the reduced viscosity should preferably be not more than 0.55 dl/g and, more preferably, not more than 0.50 dl/g, since a resin having a reduced viscosity above 0.55 dl/g tends to exhibit lower fluidity and lower thermal stability on molding.

The content of the styrene resin in Component (A) should preferably be not more than 80% by weight and, more preferably, not more than 75% by weight,since the impact strength of the resin tends to decrease significantly at a content exceeding 80% by weight, and should preferably be not less than 30% by weight, more preferably not less than 35% by weight, since at a content of less than 30% by weight, the proportion of the vinyl chloride resin increases correspondingly, tending to decrease the thermal stability during molding and to decrease thermal stability of the molded product.

The vinyl chloride resin in Component (A) should preferably have a polymerization degree of not less than 400 and, more preferably, not less than 450, since the impact strength of a vinyl chloride resin having a polymerization degree of less than 400 tends to be lower. The polymerization degree should preferably be not more than 800 and, more preferably, not more than 750, since the thermal stability of a vinyl chloride resin having a polymerization degree of greater than 800 tends to be lower. The content of the vinyl chloride resin in Component (A) should preferably not less than 20% by weight and, more preferably, not less than 25% by weight, and should preferably be not more than 70% by weight amd, more preferably, not more than 65% by weight, for the reasons described in the explanation regarding the content of the styrene resin.

The vinyl chloride resins useful in the invention include a vinyl chloride homopolymer and a copolymer constituted of 80% by weight or more of vinyl chloride units, and chlorinated products thereof. These vinyl chloride resins may be used singly or in combinations of two or more thereof. Components which can constitute the copolymer, other than vinyl chloride, include monovinylidene compounds such as ethylene. vinylacetate. methyl methacrylate and butyl acrylate, and may be in an amount of up to 20% by weight of the copolymer.

Component (B) blended with the Component (A) has an effect of providing a high thermal stability without impairing the impact strength and without causing delamination of the molded article at the gate portion of the molding machine. Component (B) is a copolymer composed of 3% to 35% by weight of a vinyl cyanide compound and 30% to 97% by weight of an alkyl acrylate, as described above.

The vinyl cyanide compounds contained in the Component (B) include acrylonitrile. methacrylonitrile, etc., which should essentially be contained in an amount of 3% to 35% by weight and, preferably, 4% to 30% by weight in order to obtain the remarkable effects of improving impact strength, delamination phenomenon, and thermal stability of the molded products.

The alkyl acrylates contained in Component (B) include ethyl acrylate, butyl acrylate, 2-ethylhexyl acrylate, etc. having an alkyl group of 2 to 8 carbons.

The alkyl acrylate content in Component (B) is adjusted so as to be in the range of from 30% to 97% by weight and, preferably, 35% to 95% by weight. Outside the above-mentioned range of the alkyl acrylate content, the effect of improving thermal stability tends to be lowered.

Component (B) copolymer can additionally be composed of another vinyl monomer copolymerizable with the vinyl cyanide compound and the alkyl acrylate.

The copolymerizable vinyl monomers include alkyl methacrylates such as methyl methacrylate, and vinyl aromatic compounds such as styrene and α-methylstyrene. which may be used singly or in combinations of two or more thereof. These vinyl monomers are preferably contained in the copolymer in an amount of not more than 67% by weight and, more preferably, not more than 60% by weight. With a content exceeding the above upper limit, the effect of improving thermal stability tends to decrease. In order to achieve the improving effect of the incorporation of the aforementioned vinyl monomer, the vinyl monomer is preferably contained in the copolymer in an amount of not less than 5% by weight and, more preferably not less than 10% by weight.

Component (B) can easily be synthesized from a vinyl cyanide compound, an alkyl acrylate and, optionally, another copolymerizable monomer by conventional emulsion polymerization with a thermal decomposition type polymerization initiator such as potassium persulfate, or a redox type polymerization initiator.

Component (B) preferably has a reduced viscosity of from 0.03 dl/g to 1.00 dl/g and, more preferably, from 0.05 dl/g to 0.80 dl/g at a concentration of 0.3 g/dl in N,N-dimethylformamide. In viscosity ranges below 0.03 dl/g, and above 1.00 dl/g, the thermal stability at the injection molding tends to decrease.

Component (B) is preferably used in an amount of from 0.5 part to 10 parts by weight and, more preferably, from 1 part to 8 parts by weight relative to 100 parts by weight of Component (A). With the use of an amount of Component (B) of less than 0.5 parts by weight, thermal stability tends not to be improved sufficiently, while with the use of an amount exceeding 10 parts by weight, the impact strength tends to decrease greatly.

Component (B), having been prepared by the process mentioned above, may be blended with component (A). Otherwise, Component (B) may be prepared so as to be incorporated in Component (A).

In addition to Component (A) and Component (B), the resin composition of the present invention may contain not only an antioxidant, a thermal stabilizer, and a lubricant which are conventionally used, but also a UV absorber, an antistatic agent, a flame retardant, a flame retardant auxilliary, and the like. For example, a phenol type antioxidant and phorphite type stabilizer which are conventionally used for styrene resins, a tin type stabilizer or a lead type stabilizer used for vinyl chloride resins, and an internal or external lubricant such as a fatty acid ester, a metal soap and a wax are suitably used for the purpose of ameliorating the performance of the resin composition of the present invention as an injection molding resin.

The composition of the present invention, which has high flame-retardant by itself, may further contain a flame-retardant agent such as of a halogen type, or a flame retardant auxiliary such as an antimony compound in a small amount, depending on requirements.

The content of the components other than the Component (A) and Component (B) in the resin composition of the present invention should preferably be not more than 25% by weight and, more preferably, not more than 20% by weight so as not to impair the effect exhibited by Component (A) and Component (B) in the resin.

The flame-retardant injection-molding resin composition of the present invention is described in more detail referring to the following Examples without limiting the invention in any way. The term "part(s)" in the Examples, Comparative Examples, and Tables means "part(s) by weight"; and the term "reduced viscosity" means a reduced viscosity of methyl-ethylketone soluble portion of the styrene resin at a concentration of 0.3 g/dl in N,N-dimethylformamide at a temperature of 30° C.

EXAMPLE 1

(1) Synthesis of Component (B)

Into a reaction vessel equipped with a stirrer and a cooler, 250 parts of water and 3 parts of sodium palmitate as an emulsifier were charged. The vessel and contents were heated to 60° C., and deaerated and purged with nitrogen. Subsequently, 0.4 part of sodium formaldehydesulfoxylate, 0.01 part of ethylenediamine tetraacetate, and 0.0025 part of ferrous sulfate were added thereto. The liquid temperature having been confirmed to be 60° C., a mixture of 10 parts of acrylonitrile, 50 parts of butyl acrylate, 30 parts of styrene, 10 parts of α-methylstyrene, 0.6 part of tertdodecyl mercaptan, and 0.1 part of cumene hydroperoxide was continuously added thereto over 5 hours. The reaction mixture was stirred at a temperature maintained at 60° C. for an additional hour to give a latex of the Component (B). The latex was subjected to salting-out to give the Component (B).

(2) Preparation of Flame-Retardant Injection-Molding Resin Composition

A mixture of 5 parts of Component (B) prepared above, 50 parts of an ABS resin having a reduced viscosity of 0.35 dl/g (hereinafter referred to as "ABS resin II"), 50 parts of a vinyl chloride resin having a polymerization degree of 600 (hereinafter referred to as "Vinyl chloride resin II"), 3 parts of a tin stabilizer, and 2 parts of a lubricant was blended by a super-mixer. The blended matter was extruded by a 40-mm extruder to give pellets of a flame-retardant injection-molding resin composition of the present invention.

EXAMPLES 2-18 AND COMPARATIVE EXAMPLES 1-13

Flame-retardant injection-molding resin compositions were prepared in the same manner as in Example 1 except that the Components (B) used were those shown in Table 1 and the contents of the Components (A) and (B) were as shown in Table 2. Pellets were prepared therefrom in the same manner as in Example 1.

As the styrene resin of Components (A), ABS resins having different reduced viscosities were used: namely, ABS resin I (reduced viscosity: 0.15 dl/g); ABS resin II (reduced viscosity: 0.35 dl/g); ABS resin III (reduced viscosity: 0.60 dl/g); ABS resin IV (reduced viscosity: 0.27 dl/g); and ABS resin V (reduced viscosity: 0.46 dl/g). As the vinyl chloride resin, vinyl chloride resins having different polymerization degrees were used: namely, Vinyl chloride resin I (polymerization degree: 300); Vinyl chloride resin II (polymerization degree: 600); Vinyl chloride resin III (polymerization degree: 900); Vinyl chloride resin IV (polymerization degree: 430); and Vinyl chloride resin V (polymerization degree: 750).

The reduced viscosity was measured as below.

REDUCED VISCOSITY

The styrene resin was dissolved at a concentration of 0.3 dl/g in N,N-dimethylformamide to give a polymer solution. The efflux time (t) of the polymer solution was measured at 30° C. by use of an Ubbelohde type viscometer (an automatic capillary viscosity measurement apparatus made by Shibayama Kagaku Kikai Seisakusho K.K.). Separately, the efflux time ($t_0$) of N,N-dimethylformamide as the solvent was measured at 30° C. with the same apparatus. The reduced viscosity ($\eta_{red}$) was calculated by the equation below.

$$\eta_{red} = (t/t_0 - 1)/C$$

where C is a concentration in g/dl of the polymer solution.

TABLE 1

| Monomer | Constitution of Component (B) | | | | | | | | | | | | | |
|---|---|---|---|---|---|---|---|---|---|---|---|---|---|---|
| | B01 | B02 | B03 | B04 | B05 | B06 | B07 | B08 | B09 | B10 | B11 | B12 | B13 | B14 |
| AN | 10 | 10 | 10 | 4 | 30 | 10 | 4 | 10 | 10 | 0 | 0 | 40 | 10 | 0 |
| BA | 50 | 50 | 50 | 50 | 50 | 40 | 95 | | | 50 | 50 | 50 | 20 | 100 |
| EA | | | | | | | | 50 | | | | | | |
| 2EHA | | | | | | | | | 50 | | | | | |
| St | 30 | 40 | 20 | 36 | 10 | 40 | 1 | 30 | 30 | 40 | 20 | 10 | 60 | |
| αS | 10 | | | 10 | 10 | 10 | | 10 | 10 | 10 | | | 10 | |

TABLE 1-continued

| Monomer | Constitution of Component (B) | | | | | | | | | | | | | |
|---|---|---|---|---|---|---|---|---|---|---|---|---|---|---|
| | B01 | B02 | B03 | B04 | B05 | B06 | B07 | B08 | B09 | B10 | B11 | B12 | B13 | B14 |
| MMA | | | | 20 | | | | | | | | 30 | | |

Note
AN: acrylonitrile, BA: Butyl acrylate, EA: Ethyl acrylate, 2EHA: 2-ethylhexyl acrylate, St: Styrene, αS: α-methylstyrene, MMA: Methyl methacrylate

TABLE 2

Constitution of Flame-Retardant Injection-Molding Resin Composition

| | Component (A) Parts | | | | | | | | | | Component (B) | |
|---|---|---|---|---|---|---|---|---|---|---|---|---|
| | Styrene Type Resins | | | | | Vinyl Chloride Type Resins | | | | | | |
| | I | II | III | IV | V | I | II | III | IV | V | Symbol | Parts |
| Example No. | | | | | | | | | | | | |
| 1 | | 50 | | | | | 50 | | | | B01 | 5 |
| 2 | | 35 | | | | | 65 | | | | B01 | 5 |
| 3 | | 60 | | | | | 40 | | | | B01 | 5 |
| 4 | | 75 | | | | | 25 | | | | B01 | 5 |
| 5 | | 50 | | | | | 50 | | | | B01 | 2 |
| 6 | | 50 | | | | | 50 | | | | B01 | 8 |
| 7 | | 50 | | | | | 50 | | | | B02 | 5 |
| 8 | | 50 | | | | | 50 | | | | B03 | 5 |
| 9 | | 50 | | | | | 50 | | | | B04 | 5 |
| 10 | | 50 | | | | | 50 | | | | B05 | 5 |
| 11 | | 50 | | | | | 50 | | | | B06 | 5 |
| 12 | | 50 | | | | | 50 | | | | B07 | 5 |
| 13 | | 50 | | | | | 50 | | | | B08 | 5 |
| 14 | | 50 | | | | | 50 | | | | B09 | 5 |
| 15 | | | | 50 | | | | | 50 | | B01 | 5 |
| 16 | | | | | 50 | | | | | 50 | B01 | 5 |
| 17 | | | 50 | | | | | | 50 | | B01 | 5 |
| 18 | | | 50 | | | | | | | 50 | B01 | 5 |
| Comparative Example | | | | | | | | | | | | |
| 1 | | 25 | | | | | 75 | | | | B01 | 5 |
| 2 | | 85 | | | | | 15 | | | | B01 | 5 |
| 3 | | 50 | | | | 50 | | | | | B01 | 5 |
| 4 | | 50 | | | | | | | 50 | | B01 | 5 |
| 5 | 50 | | | | | | 50 | | | | B01 | 5 |
| 6 | | | 50 | | | | 50 | | | | B01 | 5 |
| 7 | | 50 | | | | | 50 | | | | | 0 |
| 8 | | 50 | | | | | 50 | | | | B01 | 12 |
| 9 | | 50 | | | | | 50 | | | | B10 | 5 |
| 10 | | 50 | | | | | 50 | | | | B11 | 5 |
| 11 | | 50 | | | | | 50 | | | | B12 | 5 |
| 12 | | 50 | | | | | 50 | | | | B13 | 5 |
| 13 | | 50 | | | | | 50 | | | | B14 | 5 |

The pellets prepared above were molded into test specimens by means of a 5-ounce injection molding machine at a screw speed of 80 rpm, and a pre-set nozzle-temperature of 200° C. The molding operation was continued for one hour to obtain samples and the molding operation was stopped, and the nozzle part of the molding machine was detached.

The properties of the specimens were measured as below. Table 3 shows the results of the tests.

The thermal stability was evaluated from the extent of the burned spots in the resin remaining in the detached nozzle.

The delamination tendency was evaluated from the delamination of a 1.2-mm thick molded plate at the gate portion.

The thermal stability and the delamination tendency of the molded article were evaluated visually into 5 grades: the best one is evaluated as "5", and the worst one is evaluated as "1". In other words, the larger numeral denotes higher thermal stability or lower delamination tendency.

The impact strength was evaluated with a ¼-inch test specimen by an Izod impact test.

The thermal stability was evaluated according to the HDT (heat distortion temperature) according to ASTM D648.

The flame-retardant was tested according to UL (Underwriters Laboratories) Standard, UL 94.

TABLE 3

| Example No. | Impact Strength (kg · cm/cm) | Delamination Tendency of Molded Article | Heat Stability | Heat Resistance (°C.) | Flame Retardant |
|---|---|---|---|---|---|
| 1 | 23.7 | 5 | 5 | 75.1 | V-0 |
| 2 | 22.1 | 5 | 4 | 76.5 | V-0 |
| 3 | 21.5 | 5 | 5 | 77.5 | V-0 |
| 4 | 19.2 | 5 | 5 | 78.9 | V-0 |
| 5 | 23.9 | 5 | 4 | 76.8 | V-0 |
| 6 | 19.1 | 5 | 5 | 75.7 | V-0 |
| 7 | 23.5 | 5 | 5 | 76.3 | V-0 |
| 8 | 23.9 | 5 | 5 | 76.5 | V-0 |
| 9 | 21.6 | 5 | 5 | 76.8 | V-0 |
| 10 | 20.6 | 5 | 4 | 76.7 | V-0 |
| 11 | 22.4 | 5 | 5 | 76.6 | V-0 |
| 12 | 26.3 | 5 | 5 | 76.0 | V-0 |
| 13 | 19.8 | 5 | 4 | 77.2 | V-0 |

TABLE 3-continued

|    | Impact Strength (kg·cm/cm) | Delamination Tendency of Molded Article | Heat Stability | Heat Resistance (°C.) | Flame Retardant |
|----|------|---|---|------|-----|
| 14 | 24.3 | 5 | 4 | 75.9 | V-0 |
| 15 | 18.7 | 5 | 5 | 75.0 | V-0 |
| 16 | 30.2 | 5 | 4 | 75.3 | V-0 |
| 17 | 18.3 | 5 | 5 | 75.2 | V-0 |
| 18 | 33.5 | 5 | 4 | 75.4 | V-0 |
| Comparative Example | | | | | |
| 1  | 11.8 | 3 | 1 | 73.3 | V-0 |
| 2  | 9.7  | 4 | 5 | 79.9 | V-2 |
| 3  | 8.5  | 1 | 2 | 76.2 | V-0 |
| 4  | 37.8 | 3 | 1 | 76.8 | V-0 |
| 5  | 9.3  | 4 | 4 | 76.1 | V-0 |
| 6  | 42.3 | 2 | 1 | 76.9 | V-0 |
| 7  | 24.1 | 5 | 1 | 76.8 | V-0 |
| 8  | 12.7 | 3 | 5 | 73.5 | V-0 |
| 9  | 11.4 | 1 | 3 | 76.8 | V-0 |
| 10 | 11.7 | 3 | 3 | 76.4 | V-0 |
| 11 | 14.5 | 3 | 2 | 76.6 | V-0 |
| 12 | 9.8  | 3 | 1 | 76.3 | V-0 |
| 13 | 16.8 | 1 | 5 | 77.0 | V-0 |

Note
In Examples 3 and 4, and Comparative Example 2, 3 parts of antimony trioxide was employed as a flame retardant auxiliary Table 3 shows that the composition of the present invention is excellent in any of impact strength, delamination tendency of molded articles, thermal stability, flame retardant, and heat stability.

The flame-retardant injection-molding resin composition of the present invention is superior in impact strength and delamination tendency of the molded articles in injection molding as well as heat stability during injection molding, so that it is suitably used as an injection molding material.

While the invention has been described in detail and with reference to specific embodiments thereof, it will be apparent to one skilled in the art that various changes and modifications can be made in the invention without departing from the spirit and scope thereof.

What is claimed is:

1. A flame-retardant injection-molding resin composition comprising (A) 100 parts by weight of a flame-retardant resin composed of from 30% to 80% by weight of a styrene resin having a reduced viscosity of a methyl-ethyl-ketone soluble portion of 0.2 to 0.55 dl/g in N,N-dimethylformamide at a concentration of 0.3 g/dl at 30° C., and from 20% to 70% by weight of a polyvinyl chloride resin having a polymerization degree of from 400 to 800; and (B) 0.5 to 10 parts by weight of a copolymer of from 3% to 35% by weight of a vinyl cyanide compound, 30% to 97% by weight of alkyl acrylate, and 0% to 67% by weight of an aromatic vinyl monomer being copolymerizable with the vinyl cyanide compound and the alkyl acrylate.

2. The flame-retardant injection-molding resin composition of claim 1, wherein the styrene resin has a reduced viscosity of from 0.25 to 0.50 dl/g.

3. The flame-retardant injection-molding resin composition of claim 1, wherein the copolymer (B) has a reduced viscosity of from 0.03 to 1.00 dl/g in N,N-dimethylformamide at a concentration of 0.3 g/dl at 30° C.

* * * * *